(12) United States Patent
Mark et al.

(10) Patent No.: US 9,610,818 B2
(45) Date of Patent: Apr. 4, 2017

(54) RING LINK ASSEMBLY

(71) Applicant: ILLINOIS TOOL WORKS INC., Glenview, IL (US)

(72) Inventors: Dennis M. Mark, Buffalo Grove, IL (US); Jason K. Trotter, Des Plaines, IL (US); Troy S. Field, South Lyon, MI (US)

( * ) Notice: Subject to any disclaimer, the term of this patent is extended or adjusted under 35 U.S.C. 154(b) by 37 days.

(21) Appl. No.: 14/442,417

(22) PCT Filed: Nov. 25, 2013

(86) PCT No.: PCT/US2013/071768
§ 371 (c)(1),
(2) Date: May 13, 2015

(87) PCT Pub. No.: WO2014/093004
PCT Pub. Date: Jun. 19, 2014

(65) Prior Publication Data
US 2016/0272026 A1  Sep. 22, 2016

Related U.S. Application Data (60) Provisional application No. 61/735,131, filed on Dec. 10, 2012.

(51) Int. Cl.
*B60G 7/00* (2006.01)
*B60K 5/12* (2006.01)
(Continued)

(52) U.S. Cl.
CPC ......... *B60G 7/001* (2013.01); *B60G 21/0551* (2013.01); *B60K 5/1241* (2013.01);
(Continued)

(58) Field of Classification Search
CPC  B60G 7/001; B60G 21/0551; B60G 2206/11; B60G 2204/1224; B60G 2206/7102; B60G 2206/7101
See application file for complete search history.

(56) References Cited

U.S. PATENT DOCUMENTS 5,556,119 A * 9/1996 Buchner ................ B60G 7/001
280/124.134
5,662,348 A * 9/1997 Kusama ................ B60G 7/001
280/124.134
(Continued)

FOREIGN PATENT DOCUMENTS

DE  102007038494 A1  2/2009
JP  H0379410 A  4/1991
(Continued)

OTHER PUBLICATIONS

ISR and WO for PCT/US2013/071768 mailed May 14, 2014.

*Primary Examiner* — Darlene P Condra (57) ABSTRACT

A ring link assembly is configured to securely link a first component to a second component. The assembly may include a first housing defining a first passage having a first center, and a second housing defining a second passage having a second center. The first and second centers may reside in a common plane. A connecting beam connects the first housing to the second housing. The connecting beam may be canted with respect to the common plane. One or both of the first and second housings may connect to the connecting beam through an arcuate transition joint. A cant of the connecting beam and/or a curvature of the arcuate transition joint may be configured to reduce mechanical interference between the assembly and one or both of the first and second components.

19 Claims, 8 Drawing Sheets

(51) Int. Cl.
*B60G 21/055* (2006.01)
*F16F 1/38* (2006.01)

(52) U.S. Cl.
CPC .... *F16F 1/3849* (2013.01); *B60G 2204/1224* (2013.01); *B60G 2206/11* (2013.01); *B60G 2206/7101* (2013.01); *B60G 2206/7102* (2013.01)

(56) References Cited

U.S. PATENT DOCUMENTS

| | | | |
|---|---|---|---|
| 6,196,563 | B1 | 3/2001 | Haycraft |
| 6,254,114 | B1* | 7/2001 | Pulling ................ B60G 7/005 280/93.511 |
| 2001/0040326 | A1 | 11/2001 | Balczun et al. |
| 2003/0209870 | A1* | 11/2003 | Carlstedt ................ B60G 3/18 280/124.107 |
| 2006/0071441 | A1* | 4/2006 | Mathis ................ B60G 7/001 280/124.128 |
| 2007/0001417 | A1* | 1/2007 | Minoshima ........ B60G 21/0555 280/124.107 |
| 2010/0127469 | A1* | 5/2010 | Quaing .................... B60G 9/00 280/124.111 |
| 2011/0221153 | A1 | 9/2011 | Bladt et al. |
| 2012/0161412 | A1* | 6/2012 | Majerik ................ B60G 7/001 280/124.106 |
| 2013/0028547 | A1* | 1/2013 | Jang ................... B60G 21/0551 384/215 |
| 2013/0033018 | A1* | 2/2013 | Kiselis .................... B60G 9/00 280/124.116 |
| 2013/0113175 | A1* | 5/2013 | Renner ................ B60G 21/055 280/124.106 |
| 2015/0375589 | A1* | 12/2015 | Goldberg ................ B60G 3/20 280/124.113 |

FOREIGN PATENT DOCUMENTS

JP     H11157317 A    6/1999
WO     0077416 A2     12/2000

* cited by examiner

RING LINK ASSEMBLY

RELATED APPLICATIONS

This application is a National Phase of International Application Number PCT/US2013/071768 filed Nov. 25, 2013 and relates to and claims priority benefits from U.S. Provisional Patent Application No. 61/735,131 filed Dec. 10, 2012, which is hereby incorporated by reference in its entirety.

FIELD OF EMBODIMENTS OF THE DISCLOSURE

Embodiments of the present disclosure generally relate to ring link assemblies, and more particularly to ring link assemblies that are configured to link or otherwise connect two separate components together.

BACKGROUND

Various vehicles utilize ring links to connect certain components together. For example, ring links may be used to connect a suspension system to a stabilizer bar. In such an application, the ring links transmit loads between the suspension system and the stabilizer bar. The ring links are used and configured to allow stable cornering and reduce body roll. In contrast to an assembly that directly bolts a stabilizer bar to a suspension system, ring links allow additional articulation and provide flexibility when designing a vehicle.

In general, a ring link includes a main body that retains elastomeric cylindrical bushings at opposite ends. Studs, tubes, or loose fasteners are retained within the bushings. The main body may be formed of plastic, aluminum, or steel, for example. The bushings are typically held within passages by friction and compression of the rubber. Additionally, outer retaining lips may retain the bushings in place.

In general, the main body of the ring link is linear and resides within a common plane that contains the centers of both the bushings. For example, a first end ring of the ring link connects to a second ring at opposite ends of a linear beam extending therebetween. The linear beam typically connects to interior edges of both the first and second end rings. The entire ring link, including the end rings and beam may be within a single common plane or common planes. The end rings may be parallel or perpendicular with one another.

However, it has been found that known ring links may have portions that interfere with connected components. Once connected to the components, portions of the end rings or main body may abut into structural components of a suspension system and/or stabilizer bar, for example.

SUMMARY OF EMBODIMENTS OF THE DISCLOSURE

Embodiments of the present disclosure provide a ring link assembly configured to securely link a first component to a second component. The ring link assembly may include first and second housings and a connecting beam that connects the first housing to the second housing. The first housing may define a first passage having a first center. The first housing may be configured to securely connect to the first component. The second housing may define a second passage having a second center. The second housing may be configured to securely connect to the second component. The first and second centers may reside in a common plane.

The connecting beam may be canted or angled with respect to the common plane. The cant of the connecting beam is configured to reduce mechanical interference between the ring link assembly and one or both of the first and second components.

The first and/or second housings may connect to the connecting beam through an arcuate transition joint. A curvature of the arcuate transition joint is configured to reduce mechanical interference between the ring link assembly and one or both of the first and second components.

In at least one embodiment, one or both of the first and second housings may connect to the connecting beam through a preventative protuberance configured to mechanically interfere with one or both of the first and second components to prevent improper connection between the ring link assembly and one or both of the first and second components. The preventative protuberance may include a bump formed at a juncture of the connecting beam and one or both of the first and second housings.

In at least one embodiment, one or both of the first and second housings may include one or more securing protuberances extending within the first or second passages, respectively. The securing protuberance(s) is configured to securely engage a bushing that is configured to be retained within the first or second passages. The securing protuberance(s) may include one or more or ridges, ribs, bumps, or dimples.

In at least one embodiment, the connecting beam may include a linear cross-section. The first housing may be perpendicularly-oriented with respect to the second housing. Alternatively, the first housing may be parallel with respect to the second housing.

The ring link assembly may also include a first bushing retained within the first passage, a first fastening tube retained by the first bushing, a second bushing retained within the second passage, and a second fastening tube retained by the second bushing.

Certain embodiments of the present disclosure provide a system that may include a suspension sub-system, a stabilizer bar, and a ring link assembly that securely links the suspension sub-system to the stabilizer bar.

Certain embodiments of the present disclosure provide a ring link assembly configured to securely link a first component to a second component. The ring link assembly may include first and second housings and a connecting beam that connects the first housing to the second housing. One or both of the first and second housings may connect to the connecting beam through an arcuate transition joint. A curvature of the arcuate transition joint is configured to reduce mechanical interference between the ring link assembly and one the first and/or second components.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Figure 1:
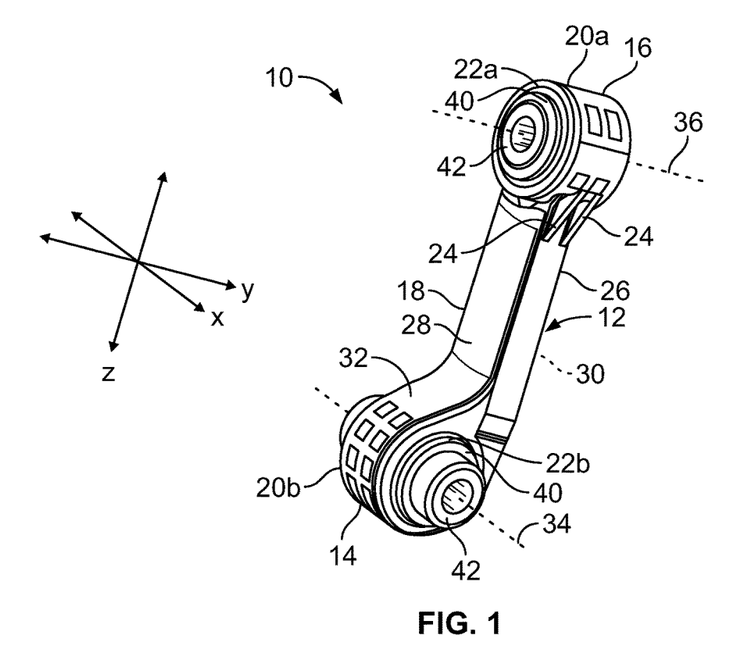
FIG. 1 illustrates a front perspective view of a ring link assembly, according to an embodiment of the present disclosure.

FIG. 1 illustrates a front perspective view of a ring link assembly 10, according to an embodiment of the present disclosure. The ring link assembly 10 includes a main body 12 including an end ring 14 connected to an end ring 16 (at an opposite end of the main body 12) through a connecting beam 18. The main body 12 may be formed from various materials, such as plastic, aluminum, steel, and/or the like. The main body 12 may be integrally formed and molded from a single piece of material. For example, the main body 12 may be formed of injection molded plastic. Alternatively, the main body 12 may be formed from separate and distinct components that are bonded together and/or connected through fasteners and/or adhesives.

The end ring 16 includes a housing, such as an outer circumferential housing 20a, that defines a passage, such as an internal cylindrical passage 22a. One or more support struts 24 may tangentially extend from an outer surface of the circumferential housing 20a to lateral surfaces 26 of the connecting beam 18. The support struts 24 provide bracing support to the end ring 16 with respect to the connecting beam 18. While not shown, support struts may also connect an outer surface of a circumferential housing 20b of the end ring 14 to a front or rear surface 28 and 30, respectively, of the connecting beam 18.

As shown, another housing, such as the circumferential housing 20b of the end ring 14, also defines a passage, such as an internal cylindrical passage 22b, and connects to the front surface 28 of the connecting beam 18 through an arcuate transition joint 32. The arcuate transition joint 32 may curve from the circumferential housing 20 toward the front surface 28 of the connecting beam 18. The curve of the arcuate transition joint 32 may curve away from the curvature of the circumference of the cylindrical passage 22b. As shown in FIG. 1, the arcuate transition joint 32 may diverge from the curvature of the circumference of the cylindrical passage 22b. While not shown, the end ring 16 may also connect to the lateral surfaces 26 of the connecting beam through one or more arcuate transition joints.

As shown, the end ring 16 may be perpendicular to the end ring 14. For example, a longitudinal axis 34 of the end ring 14 may be perpendicular to a longitudinal axis 36 of the end ring 16. The longitudinal axis 34 may be aligned with the X-axis, while the longitudinal axis 36 may be aligned with the Y-axis, which may be orthogonal to the X-axis. The end rings 14 and 16 may be separated from one another a distance along the Z-axis, which is orthogonal to both the X- and Y-axes. Alternatively, the end rings 14 and 16 may be parallel with one another, such that their respective longitudinal axes 34 and 36, respectively, are aligned with and along the same axis.

The ring link assembly 10 may also include a cylindrical bushing 40 retained within each cylindrical passage 22a and 22b, respectively. Each bushing 40 may in turn retain a fastening tube 42 therein. The fastening tube 42 may connect to a component, such as a suspension system or stabilizer bar. Optionally, the fastening tube 42 may form a portion of the suspension system or stabilizer bar.

Figure 2:
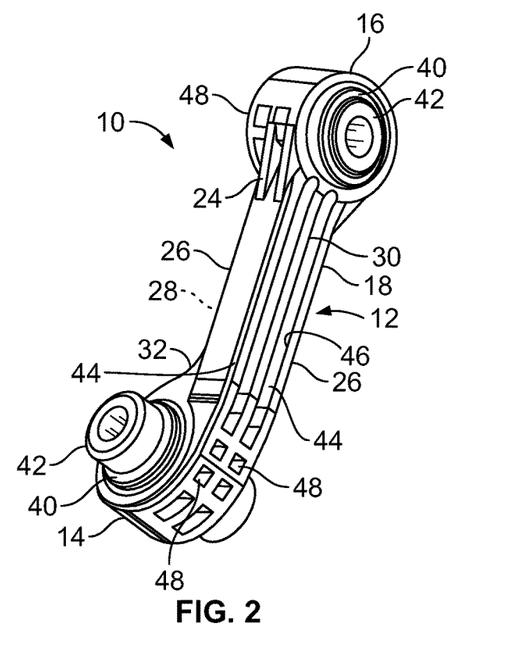
FIG. 2 illustrates a rear perspective view of a ring link assembly, according to an embodiment of the present disclosure.

FIG. 2 illustrates a rear perspective view of the ring link assembly 10, according to an embodiment of the present disclosure. The rear surface 30 of the connecting beam 18 may include recessed longitudinal channels 44 separated by a longitudinal rib 46. The longitudinal channels 44 may be configured to provide reduced mass to the connecting beam 18, while the longitudinal rib 46 provides stiffening support. The connecting beam 18 may include more or less channels 44 than shown. In at least one embodiment, the rear surface 30 may not include channels 44 and/or the rib 46, but may instead be a flat planar surface, such as the front surface 28 (shown in FIG. 1). Additionally, alternatively, the front surface 28 may include one or more longitudinal channels and ribs.

The circumferential housings 20a and 20b may also include cored-out areas 48, which may be configured to reduce the overall material of the ring link assembly 10. Alternatively, the circumferential housings 20a and 20b may not include the cored-out areas 48.

Figure 3:
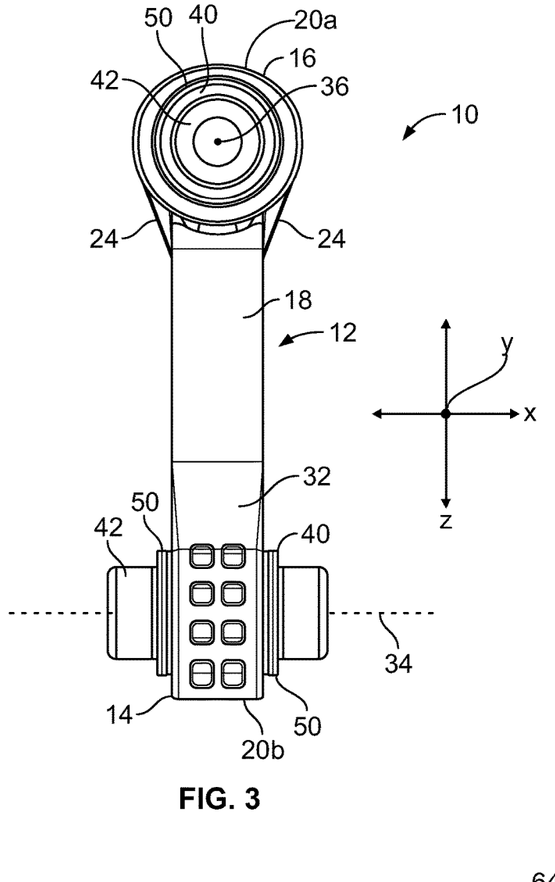
FIG. 3 illustrates a front view of a ring link assembly, according to an embodiment of the present disclosure.

FIG. 3 illustrates a front view of the ring link assembly 10. As shown in FIG. 3, the longitudinal axis 36 of the circumferential hosing 20a is parallel to the Y-axis, and is perpendicular to the longitudinal axis 34 of the circumferential housing 20b, which is parallel to the X-axis. Each bushing 40 may be retained within the respective housings 20a and 20b such that ends 50 of the bushings 40 extend out of the housings 20a and 20b. The fastening tubes 42 may be of varying lengths and may extend through and past the ends 50 of the bushings 40.

Figure 4:
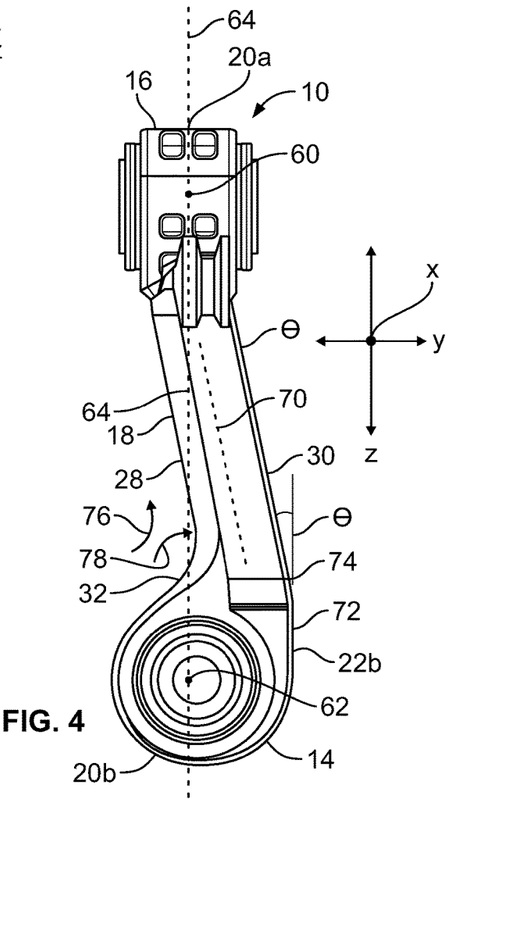
FIG. 4 illustrates a lateral view of a ring link assembly, according to an embodiment of the present disclosure.

FIG. 4 illustrates a lateral view of the ring link assembly 10. The center 60 of the housing 20a and the center 62 of the housing 20b are contained within a common plane 64. Each center 60 and 62 may be a radial, axial, and longitudinal center of each respective housing 20a and 20b. As shown in FIG. 4, the centers 60 and 62 may be connected to one another through a line that is parallel with the Z-axis. The centers 60 and 62 may be contained within and aligned with and along the common plane 64 in order to provide increased strength that resists buckling.

The centers 60 and 62 reside in the common plane 64. Notably, however, a central longitudinal axis 70 of the connecting beam 18 may not be contained within the plane 64. Instead, the central longitudinal axis 70 is canted and angled with respect to the plane 64.

The connecting beam 18 may be canted or angled with respect to the plane 64. For example, the longitudinal axis 70 of the connecting beam 18 may be canted with respect to the plane 64 at an angle θ, which may be between 15° -35°, for example. Alternatively, the angle θ may be less than 15° or greater than 35°. The rear surface 30 of the connecting beam 18 may connect to a flat planar surface 72 of the housing 20b at the angle θ, thereby forming a preventative protuberance 74, such as a bump, ridge, ledge, or the like, at the juncture therebetween. The preventative protuberance 74 may provide increased strength to the ring link assembly 10, and may be configured to mechanically interfere with a component to prevent improper installation thereto. For example, the preventative protuberance 74 may interfere with a component, such as spring link or collar of a suspension system, when one attempts to incorrectly secure the ring link assembly 10 to the component. Conversely, the preventative protuberance 74 does not mechanically interfere with the component when properly secured thereto.

While the connecting beam 18 may be canted or angled, as shown in FIG. 4, the connecting beam 18 may generally be linear. The straight, linear cross-section of the connecting beam 18 may provide increased strength that resists buckling stresses or strains. The linear cross-section of the connecting beam 18 contrasts with a C-shape or offset cross-section, which may be weaker and susceptible to material fatigue.

As noted above, a curve 76 of the arcuate transition joint 32 may diverge from a circumferential curve 78 of the cylindrical passage 22b of the housing 20b. The arcuate transition joint 32 provides a contoured surface configured to provide dynamic clearance with a component to which the ring link assembly 10 secures. For example, the curve 76 of the arcuate transition joint 32 is sized and shaped so that the housing 20b and the connecting beam 18 do not mechanically interfere with or adversely abut into the component when the assembly 10 is secured thereto.

Figure 5:
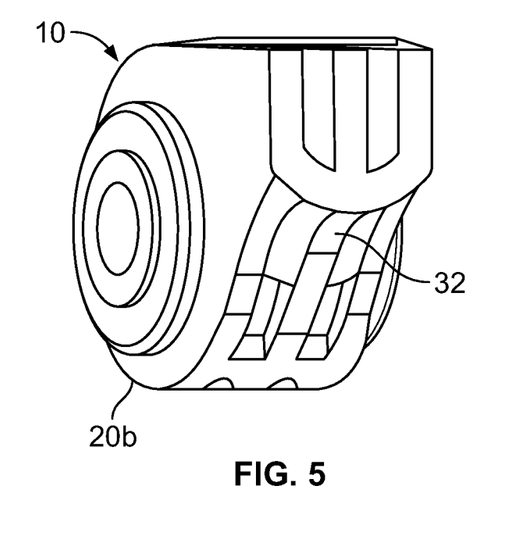
FIG. 5 illustrates a perspective view of an arcuate transition joint of a circumferential housing of a ring link assembly, according to an embodiment of the present disclosure.
Figure 6:
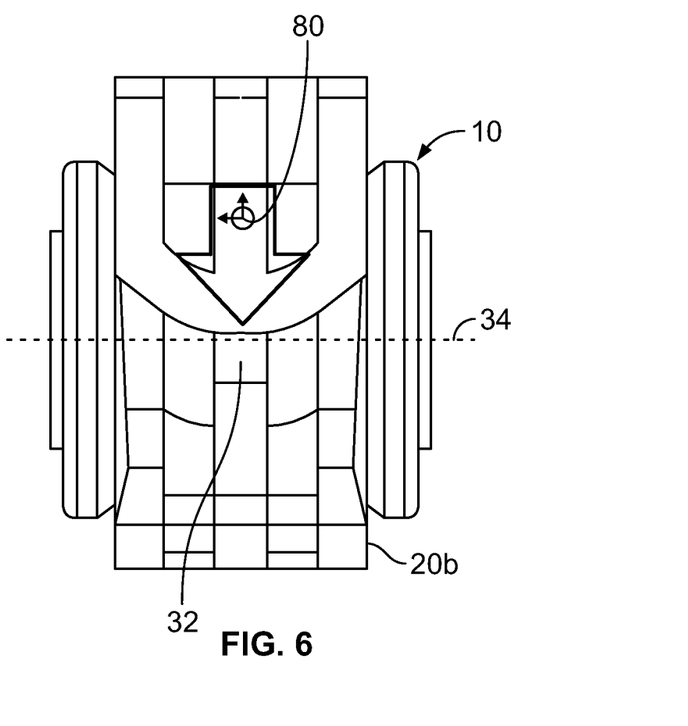
FIG. 6 illustrates a front view of an arcuate transition joint of a circumferential housing of a ring link assembly, according to an embodiment of the present disclosure.

FIGS. 5 and 6 illustrate perspective and front views, respectively, of the arcuate transition joint 32 of the circumferential housing 20b of the ring link assembly 10, according to an embodiment of the present disclosure. Referring to FIGS. 5 and 6, the arcuate transition joint 32 provides a curved lead edge that provides clearance with a curved edge of a component, such as a spring link or collar. Further, the geometry of the arcuate transition joint 32 shifts (in contrast to an assembly without an arcuate transition joint) a centroid 80 of the housing 20b toward the longitudinal axis 34 of the housing 20b. It has been found that the arcuate transition joint 32, in shifting the centroid 80 toward the longitudinal axis 34, provides increased strength to the ring link assembly 10, thereby resisting buckling stresses and/or strains. Further, the arcuate transition joint 32 may increase a loading area on the housing 20b. While FIGS. 5 and 6 show an arcuate transition joint 32 having channels formed therein, the arcuate transition joint 32 may optionally include a smoothed, contiguous outer surface, such as shown in FIGS. 1 and 3, for example.

Referring to FIGS. 1-6, as noted above, while the housing 20b is shown connecting to the connecting beam 18 through the arcuate transition joint 32, the housing 20a may also connect to the connecting beam 18 through an arcuate transition joint 32. Further, each of the housings 20b and 20a may include one or more arcuate transition joints 32 that connect to any surface of the connecting beam 18. For example, the housing 20b may connect to the connecting beam 18 through front and rear arcuate transition joints that connect to front and rear surfaces 28 and 30, respectively, of the connecting beam 18. Also, the housing 20a may include lateral arcuate joint transition joints that connect to the lateral surfaces 26 of the connecting beam 18. When multiple arcuate transition joins 32 are used, the curvature of the arcuate transition joints 32 may be conforming or non-conforming. For example, if front and rear arcuate transition joints are used to connect the housing 20b to the connecting beam 18, both the front and rear arcuate transition joints may have the same radius and/or curvature, or differing radii and curvature.

The curve 76 of the arcuate transition joint 32 curves from the housing 20b into the connecting beam 18 in order to direct forces toward the plane 64. In this manner, the forces may be directed toward the plane 64 or longitudinal center line, while the transition curve 32 does not interfere with or adversely abut into the component to which the housing 20b connects.

Figure 7:
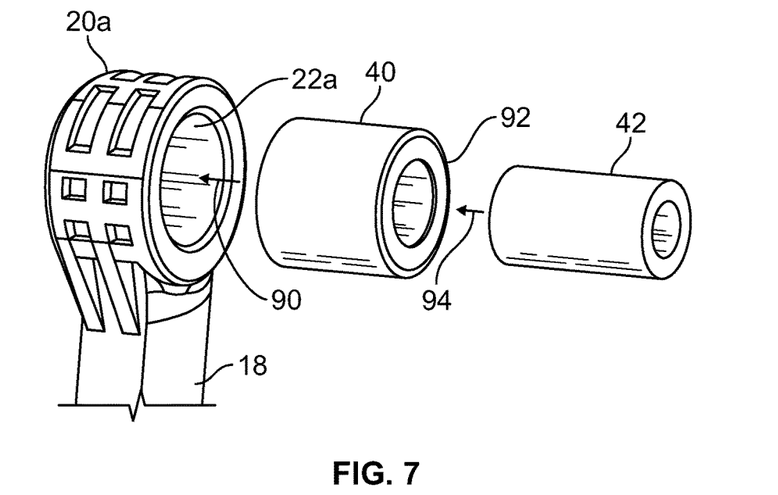
FIG. 7 illustrates a perspective view of a bushing and fastening tube being inserted into a circumferential housing, according to an embodiment of the present disclosure.

FIG. 7 illustrates a perspective view of a bushing 40 and fastening tube 42 being inserted into the circumferential housing 20a, according to an embodiment of the present disclosure. In order to secure the bushing 40 into the cylindrical passage 22a, the bushing 40 is aligned with the cylindrical passage 22a and urged therein in the direction of arrow 90. The bushing 40 may be formed of an elastomeric material and may flex into secure engagement within the cylindrical passage 22a.

The fastening tube 42 may be similarly aligned with an internal passage 92 of the bushing 40 and urged therein in the direction of arrow 94. The fastening tube 42 may be formed of metal, such as steel or aluminum. The bushing 40 may be bonded to one or both of the housing 20a and/or the fastening tube 42.

While the bushing 40 and the fastening tube 42 are shown with respect to the housing 20a, the housing 20b may receive and retain a bushing and fastening tube in a similar fashion.

Figure 8:
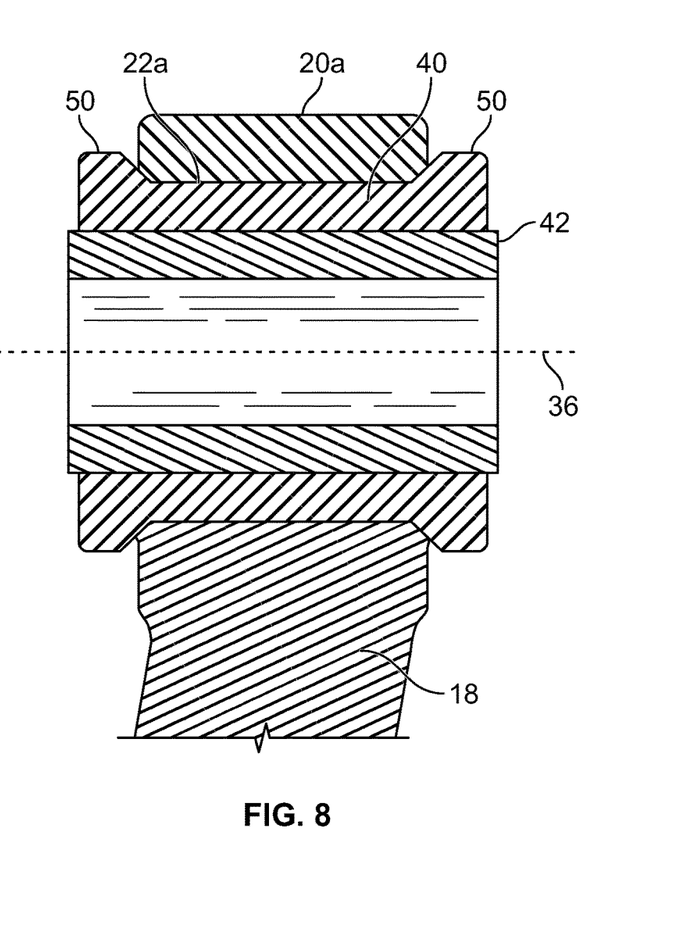
FIG. 8 illustrates an axial cross-sectional view of a circumferential housing retaining a bushing and fastening tube, according to an embodiment of the present disclosure.

FIG. 8 illustrates an axial cross-sectional view of the circumferential housing 20a retaining the bushing 40 and the fastening tube 42, according to an embodiment of the present disclosure. As shown, the ends 50 of the bushing 40 may have a diameter that exceeds that of the cylindrical passage 22a. Because the bushing 40 may be formed of an elastomeric material, such as rubber, as the bushing 40 is urged into the cylindrical passage 22a, the lead end 50 may contract and pass through the passage 22a. As the lead end 50 passes out of the passage 22a, the lead end 50 may expand back to its at-rest position, and the bushing 40 may be securely retained within the passage 22a between the expanded, at-rest ends 50.

As shown in FIG. 8, each of the housing 20a, the bushing 40, and the fastening tube 42 may be coaxial. As such, the longitudinal axis 36 of the housing 20a may be the same for the bushing 40 and the fastening tube 42. While not shown, the inner diameter of the bushing 40 may also be tapered, similar to the outer diameter.

Figure 9:
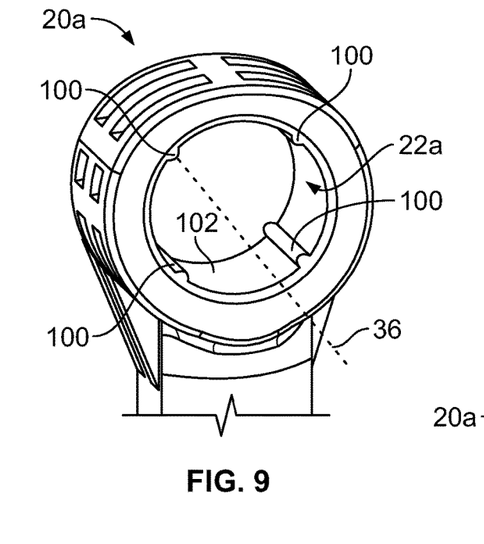
FIG. 9 illustrates a perspective front view of a circumferential housing, according to an embodiment of the present disclosure.

FIG. 9 illustrates a perspective front view of the circumferential housing 20a, according to an embodiment of the present disclosure. One or more securing protuberances 100 may extend inwardly from an internal circumferential surface 102 of the housing 20a that define the cylindrical passage 22a. As shown in FIG. 9, four securing protuberances 100 extend from the internal circumferential surface 102 into the passage 22a. The securing protuberances 100 may be in the form of smooth-arched ridges or ribs that are parallel with the longitudinal axis 36 and linearly extend along the length of the housing 20a. The four securing protuberances 100 may be regularly spaced about the internal circumferential surface 102. For example, each securing protuberance 100 may be spaced from a neighboring securing protuberance 100 by 45 radial degrees. More or less securing protuberances 100 than shown may be used. Alternatively, the securing protuberances 100 may have various other shapes and forms. For example, the securing protuberances may include sharp edges.

In operation, the securing protuberances 100 engage and provide a securing force into the bushing 40 (shown in FIGS. 7 and 8, for example). The securing protuberances 100 increase pre-compression and friction with respect to the bushing 40. As such, the securing protuberances 100 are configured to resist rotation and slipping of the bushing 40 within the passage 22a. The securing protuberances 100 may create indentations in the bushing 40, thereby preventing the bushing 40 from sliding and slipping within the passage 22a. Optionally, the bushing 40 may include reciprocal channels configured to receive and retain the securing protuberances 100.

The cylindrical passage 22b may include similar securing protuberances as shown in FIG. 9.

Figure 10:
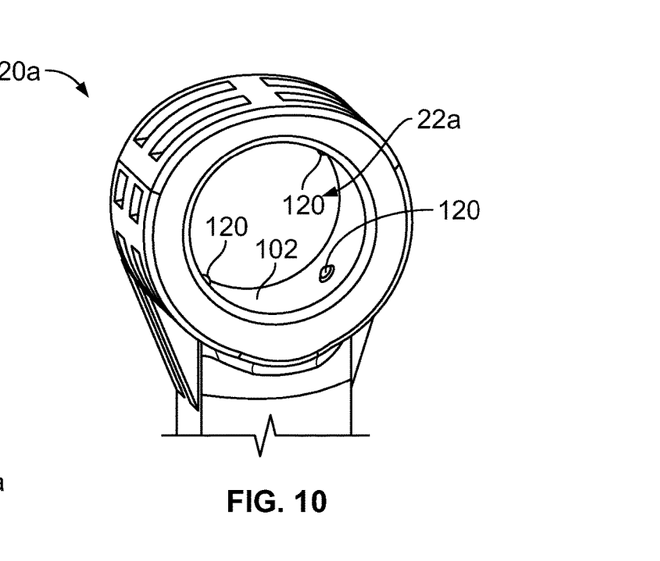
FIG. 10 illustrates a perspective front view of a circumferential housing, according to an embodiment of the present disclosure.

FIG. 10 illustrates a perspective front view of the circumferential housing 20a, according to an embodiment of the present disclosure. The circumferential housing 20a may include securing protuberances 120 in the form of hemispherical bumps or dimples that extend inwardly from an internal circumferential surface 102 into the passage 22a. The securing protuberances 120 may be regularly spaced about the internal circumferential surface 102. The securing protuberances 120 may be aligned along a common circular circumference, such as within the center of the internal circumferential surface 102. Alternatively, the securing protuberances 120 may be irregularly spaced about the internal circumferential surface 102 and may not be aligned along a common circular circumference.

The cylindrical passage 22b may include similar securing protuberances as shown in FIG. 10.

Figure 11:
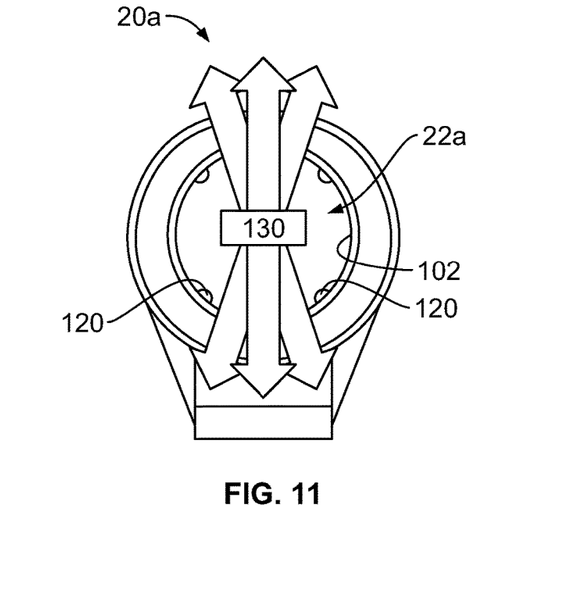
FIG. 11 illustrates a front view of a circumferential housing, according to an embodiment of the present disclosure.

FIG. 11 illustrates a front view of the circumferential housing 20a, according to an embodiment of the present disclosure. The securing protuberances 120 (or 100, as shown in FIG. 9) may be positioned outside of a primary volume 130 of articulated loading. Locating the protuberances outside of the primary volume 130 decreases the possibility that the features may dig and abrade the bushing. Alternatively, the securing protuberances 120 may extend into the primary volume 130 of articulated loading.

Figure 12:
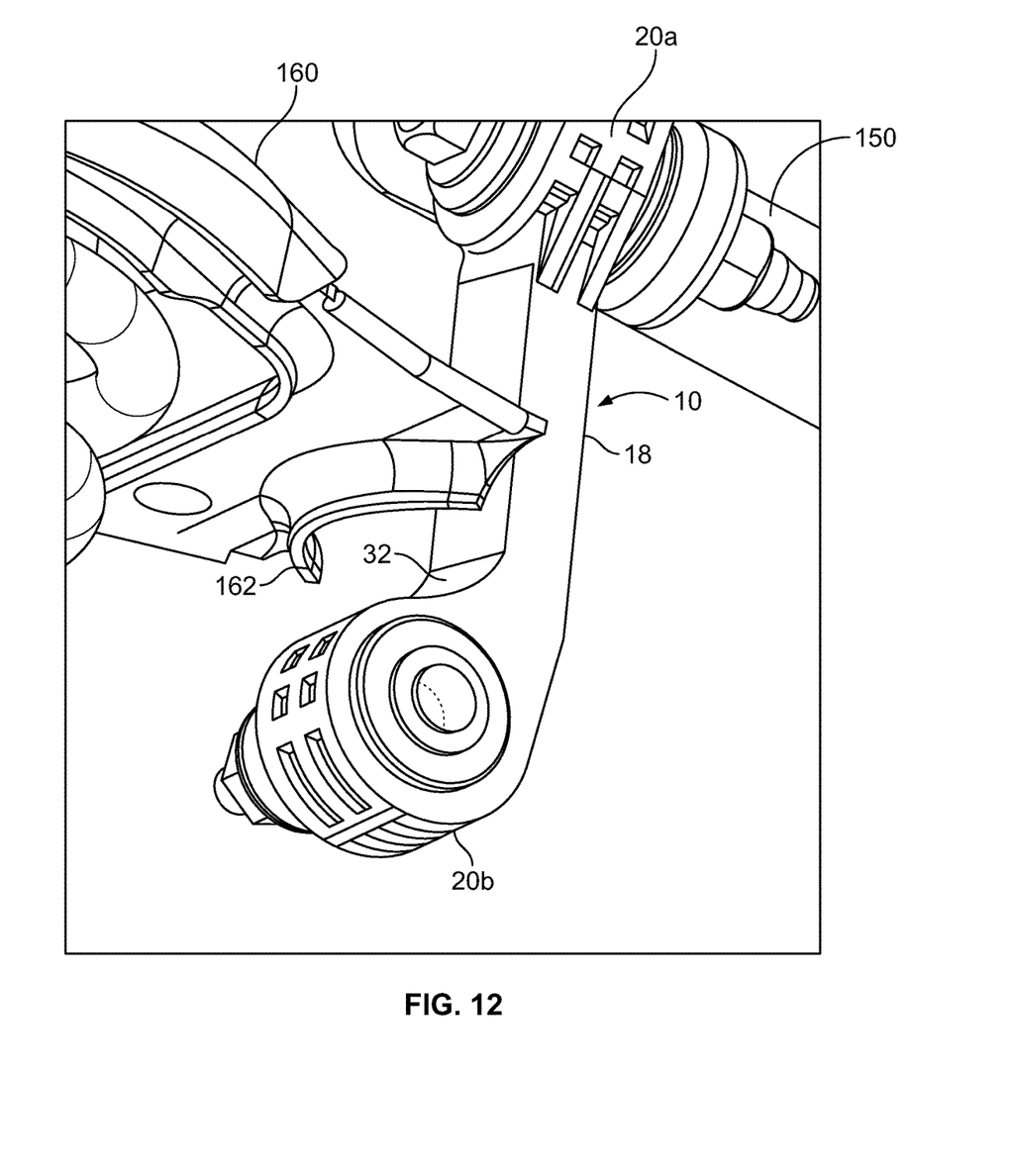
FIG. 12 illustrates a perspective bottom view of a ring link assembly securing a stabilizer bar to a suspension system, according to an embodiment of the present disclosure.

FIG. 12 illustrates a perspective bottom view of the ring link assembly 10 securing a stabilizer bar 150 to a suspension system 160, according to an embodiment of the present disclosure. The housing 20a may connect to a portion of the stabilizer bar 150, while the housing 20b is configured to connect to the suspension system 160. As shown, the arcuate transition joint 32 is sized and shape to cooperate with the shape of a collar 162 of the suspension system 160. The canted nature of the connecting beam 18 ensures that the arcuate transition joint 32 and the connecting beam 18 are set back with respect to the collar 162, so as not to mechanically interfere with or undesirably engage the collar 162. The contour of the ring link assembly 10, as shown by the arcuate transition joint 32 and the canted connecting beam 18, provides a clearance area between components of the suspension system 160, while still connecting the housing 20b to a portion of the suspension system 160.

Figure 13:
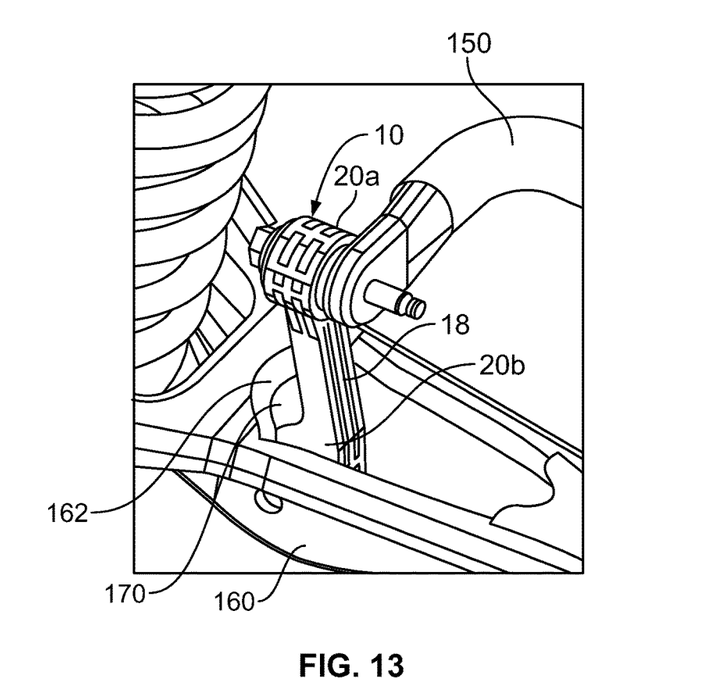
FIG. 13 illustrates a perspective top view of a ring link assembly securing a stabilizer bar to a suspension system, according to an embodiment of the present disclosure.

FIG. 13 illustrates a perspective top view of the ring link assembly 10 securing the stabilizer bar 150 to the suspension system 160. As shown, when the ring link assembly 10 is secured to both the stabilizer bar 150 and the suspension system 160, a clearance area 170 is formed between the arcuate transition joint 32 and the collar 162 of the suspension system 160. Notably, known ring links that lack an arcuate transition joint and a canted connecting beam would abut into and mechanically interfere with at least the collar 162. In contrast, the contour of the ring link assembly 10 provides the clearance area 170 that prevents, minimizes, or otherwise reduces undesired contact between the ring link assembly 10 and the suspension system 160.

Figure 14:
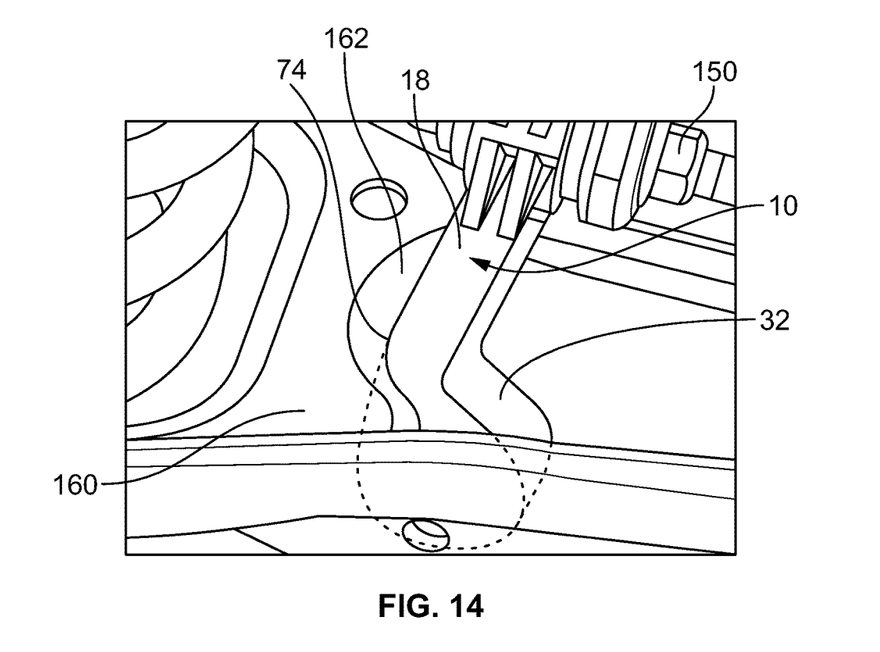
FIG. 14 illustrates a perspective bottom view of a ring link assembly improperly connected to a suspension system, according to an embodiment of the present disclosure.

FIG. 14 illustrates a perspective bottom view of the ring link assembly 10 improperly connected to the suspension system 160, according to an embodiment of the present disclosure. When the ring link assembly 10 is connected in an improper fashion (reversed from the proper orientation), the canted connecting beam 18 forces the preventative protuberance 74 into the collar 162, which creates a direct abutting relationship and mechanical interference therebetween. As such, an installer is immediately notified of an improper reverse connection, as the connecting beam 18 and the arcuate transition joint 32 do not contact the collar 162 in the proper orientation, as shown in FIG. 13. Because an installer is provided immediate feedback as to whether or not the ring link assembly 10 is properly secured to the suspension system 160, the manufacturing process is efficient, both in terms of labor and time.

Figure 15:
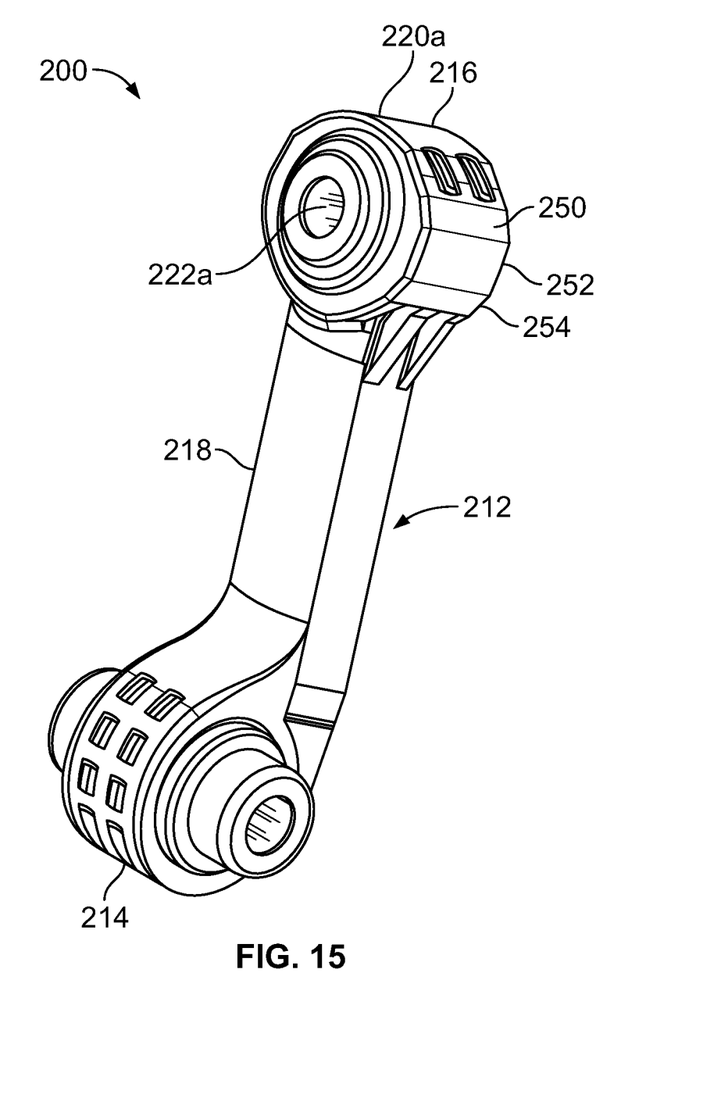
FIG. 15 illustrates a front perspective view of a ring link assembly, according to an embodiment of the present disclosure.

FIG. 15 illustrates a front perspective view of a ring link assembly 200, according to an embodiment of the present disclosure. The ring link assembly 200 is similar to the ring link assembly 10 shown in FIG. 1, for example. Similar to the ring link assembly 10, the ring link assembly 200 includes a main body 212 including an end ring 214 connected to an end ring 216 (at an opposite end of the main body 212) through a connecting beam 218.

The end ring 216 includes a housing, such as an outer circumferential housing 220a, that defines a passage, such as an internal cylindrical passage 222a. An outer circumference 250 of the end ring 216 may include thickened walls 252, such as at a mid-section 254. The thickened walls 252 provide increased strength that resists material fatigue and wear. While shown at the mid-section 254, the thickened walls 252 may optionally extend around an entire circumference of the housing 220a, or at various other portions thereof. Additionally, the end ring 214 may also include thickened wall portions that extend around a portion or an entire circumference of the end ring 214.

Embodiments of the present disclosure provide ring link assemblies that may be contoured for optimum dynamic clearance. The ring link assemblies may include bushings having inner diameters that are configured to improve performance, such as through inwardly-directed protuberances. The ring link assemblies may be configured to maintain tensile and buckling strengths through a combination of high tensile plastic, ribbed features, robust cross-section, and end rings aligned and centered with respect to one another.

Embodiments of the present disclosure provide ring link assemblies that are stiff, strong, and long-lasting. A stiffer part responds faster to vehicle movement, and provides sharper handling and crisper response.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

Various features of the disclosure are set forth in the following claims.

The invention claimed is:

1. A ring link assembly configured to securely link a first component to a second component, the ring link assembly comprising:
   a first housing defining a first passage having a first center, wherein the first housing is configured to securely connect to the first component;
   a second housing defining a second passage having a second center, wherein the second housing is configured to securely connect to the second component, wherein the first and second centers reside in a common plane;
   a connecting beam that connects the first housing to the second housing, wherein the connecting beam is canted with respect to the common plane, and wherein a cant of the connecting beam is configured to reduce mechanical interference between the ring link assembly and one or both of the first and second components; and
   one or more support struts that tangentially extend from an outer surface of one or both of the first housing or the second housing to one or more lateral surfaces of the connecting beam.

2. The ring link assembly of claim 1, wherein one or both of the first and second housings connect to a front surface of the connecting beam through an arcuate transition joint, wherein a curvature of the arcuate transition joint is configured to reduce mechanical interference between the ring link assembly and one or both of the first and second components.

3. The ring link assembly of claim 1, wherein one or both of the first and second housings connect to the connecting beam through a preventative protuberance configured to mechanically interfere with one or both of the first and second components to prevent improper connection between the ring link assembly and one or both of the first and second components.

4. The ring link assembly of claim 3, wherein the preventative protuberance is a bump formed at a juncture of the connecting beam and one or both of the first and second housings.

5. The ring link assembly of claim 1, wherein one or both of the first and second housings further comprises one or more securing protuberances extending within the first or second passages, respectively, wherein the one or more securing protuberances are outside of a primary volume of articulated loading of the first and second housings, wherein the one or more securing protuberances are configured to securely engage a bushing that is configured to be retained within the first or second passages.

6. The ring link assembly of claim 5, wherein the one or more securing protuberances include one or more or ridges, ribs, bumps, or dimples that extend from an internal circumferential surface towards a longitudinal axis of one or both of the first and second housings.

7. The ring link assembly of claim 1, wherein the connecting beam comprises a linear cross-section.

8. The ring link assembly of claim 1, wherein the first housing is perpendicularly-oriented with respect to the second housing.

9. The ring link assembly of claim 1, further comprising:
   a first bushing retained within the first passage;
   a first fastening tube retained by the first bushing;
   a second bushing retained within the second passage; and
   a second fastening tube retained by the second bushing.

10. A system comprising:
    a suspension sub-system;
    a stabilizer bar; and
    a ring link assembly that securely links the suspension sub-system to the stabilizer bar, the ring link assembly comprising:
       a first housing defining a first passage having a first center, wherein the first housing is configured to securely connect to the suspension sub-system;
       a second housing defining a second passage having a second center, wherein the second housing is configured to securely connect to the stabilizer bar, wherein the first and second centers reside in a common plane;
       a connecting beam that connects the first housing to the second housing, wherein the connecting beam is canted with respect to the common plane, and wherein a cant of the connecting beam is configured to reduce mechanical interference between the ring link assembly and one or both of the suspension sub-system and the stabilizer bar; and
       one or more support struts that tangentially extend from an outer surface of one or both of the first housing or the second housing to a lateral surface of the connecting beam.

11. The system of claim 10, wherein one or both of the first and second housings connect to a front surface of the connecting beam through an arcuate transition joint, wherein a curvature of the arcuate transition joint is configured to reduce mechanical interference between the ring link assembly and one or both of the suspension sub-system and the stabilizer bar.

12. The system of claim 10, wherein one or both of the first and second housings connect to the connecting beam through a preventative protuberance configured to mechanically interfere with at least a portion of one or both of the suspension sub-system or the stabilizer bar to prevent improper connection between the ring link assembly and one or both of the suspension sub-system and the stabilizer bar.

13. The system of claim 12, wherein the preventative protuberance is a bump formed at a juncture of the connecting beam and one or both of the first and second housings.

14. The system of claim 10, wherein one or both of the first and second housings further comprises one or more securing protuberances extending within the first or second passages, respectively, wherein the one or more securing protuberances are outside of a primary volume of articulated loading of the first and second housings, wherein the one or more securing protuberances are configured to securely engage a bushing that is configured to be retained within the first or second passages.

15. The system of claim 14, wherein the one or more securing protuberances include one or more or ridges, ribs, bumps, or dimples that extend from an internal circumferential surface towards a longitudinal axis of one or both of the first and second housings.

16. The system of claim 10, wherein the connecting beam comprises a linear cross-section.

17. The system of claim 10, wherein the first housing is perpendicularly-oriented with respect to the second housing.

18. The system of claim 10, further comprising:
 a first bushing retained within the first passage;
 a first fastening tube retained by the first bushing;
 a second bushing retained within the second passage; and
 a second fastening tube retained by the second bushing.

19. A ring link assembly configured to securely link a first component to a second component, the ring link assembly comprising:
 a first housing defining a first passage having a first center, wherein the first housing is configured to securely connect to the first component;
 a second housing defining a second passage having a second center, wherein the second housing is configured to securely connect to the second component, wherein the first and second centers reside in a common plane;
 a connecting beam that connects the first housing to the second housing, wherein one or both of the first and second housings connect to a front surface the connecting beam through an arcuate transition joint, wherein a curvature of the arcuate transition joint is configured to reduce mechanical interference between the ring link assembly and one or both of the first and second components; and
 one or more support struts that tangentially extend from an outer surface of one or both of the first housing or the second housing to one or more lateral surfaces of the connecting beam.

\* \* \* \* \*